(12) United States Patent
Gaufin et al.

(10) Patent No.: US 10,059,322 B2
(45) Date of Patent: Aug. 28, 2018

(54) APPARATUSES, SYSTEMS, AND METHODS FOR DETECTING AIR BRAKE SPRING FAILURE ON A VEHICLE

(71) Applicant: TSE Brakes, Inc., Cullman, AL (US)

(72) Inventors: Carl Gaufin, Madison, AL (US); Will Brandon Drake, Cullman, AL (US)

(73) Assignee: TSE Brakes, Inc., Cullman, AL (US)

( * ) Notice: Subject to any disclaimer, the term of this patent is extended or adjusted under 35 U.S.C. 154(b) by 0 days.

(21) Appl. No.: 15/331,365

(22) Filed: Oct. 21, 2016

(65) Prior Publication Data

US 2017/0113672 A1  Apr. 27, 2017

Related U.S. Application Data

(60) Provisional application No. 62/245,411, filed on Oct. 23, 2015.

(51) Int. Cl.
   *B60T 17/08* (2006.01)
   *B60T 17/22* (2006.01)

(52) U.S. Cl.
   CPC .......... *B60T 17/221* (2013.01); *B60T 17/083* (2013.01); *B60T 17/22* (2013.01)

(58) Field of Classification Search
   CPC . B60Q 1/00; B60T 8/88; B60T 17/088; F16D 65/28; F15B 15/02
   USPC ....... 188/1.11 E, 153 D; 73/121, 130; 92/63, 92/96, 98 R, 128
   See application file for complete search history.

(56) References Cited

U.S. PATENT DOCUMENTS

| | | | |
|---|---|---|---|
| 3,800,668 A | 4/1974 | Valentine | |
| 4,836,024 A | 6/1989 | Woehrl et al. | |
| 5,430,334 A | 7/1995 | Meister | |
| 5,713,238 A * | 2/1998 | Pierce | B60T 17/083 73/121 |
| 5,829,339 A | 11/1998 | Smith | |
| 6,843,537 B2 * | 1/2005 | Babala | G01L 15/00 303/122.09 |
| 6,888,451 B1 * | 5/2005 | Plantan | B60T 17/085 188/1.11 E |
| 7,218,226 B2 | 5/2007 | Wehrenberg | |
| 7,941,256 B2 | 5/2011 | Namuduri et al. | |
| 7,979,207 B2 | 7/2011 | Chowdhary et al. | |
| 8,179,275 B2 | 5/2012 | Jankovsky | |
| 8,296,103 B2 | 10/2012 | Son et al. | |
| 9,050,958 B2 | 6/2015 | Gaufin | |

(Continued)

FOREIGN PATENT DOCUMENTS

DE   695 14 360   9/2000

OTHER PUBLICATIONS

International Search Report and Written Opinion for PCT/US2016/058442 dated Jan. 6, 2017.

*Primary Examiner* — Christopher P Schwartz
(74) *Attorney, Agent, or Firm* — Andrus Intellectual Property Law, LLP (57) ABSTRACT

Spring failure detection systems include an air brake cylinder having a spring axially extending therein, a sensor coupled to the air brake cylinder and configured to sense forces applied to the air brake cylinder, an indicator coupled to the sensor and configured to indicate failure of the spring based on the forces sensed by the sensor, and a controller in communication with the sensor and configured to control the indicator. Methods for detecting failure of a spring are also disclosed.

13 Claims, 4 Drawing Sheets

(56) References Cited

U.S. PATENT DOCUMENTS

| | | |
|---|---|---|
| 9,297,392 B2 | 3/2016 | Gaufin |
| 2014/0096677 A1 | 4/2014 | Gaufin |
| 2015/0059989 A1 | 3/2015 | Gutierrez |
| 2015/0109129 A1 | 4/2015 | Merril et al. |
| 2015/0363983 A1 | 12/2015 | Cunnings |
| 2016/0025590 A1 | 1/2016 | Munger et al. |

* cited by examiner

APPARATUSES, SYSTEMS, AND METHODS FOR DETECTING AIR BRAKE SPRING FAILURE ON A VEHICLE

CROSS-REFERENCE TO RELATED APPLICATION

The present application claims priority to and the benefit of U.S. Provisional Application No. 62/245,411 filed on Oct. 23, 2015, which is hereby incorporated herein by reference.

FIELD

The present disclosure relates to apparatuses, systems, and methods for detecting failure of an air brake on a vehicle, specifically for detecting failure of a spring associated with the air brake.

BACKGROUND

The following U.S. Patents are hereby incorporated by reference in entirety.

U.S. Pat. No. 5,829,339 discloses a sealed bushing assembly adapted to permit a push rod to pass through an adapter isolating a pressurized chamber, formed by attaching a sleeve to said adapter, inserting a bushing, and crimping the end of said sleeve opposite said adapter to restrain said bushing.

U.S. Pat. No. 9,050,958 discloses a rotationally adjustable brake actuator that includes a pressure housing with a circumferential rim, a non-pressure housing having a second circumferential rim, and a diaphragm disposed therebetween, where a retaining ring holds the respective housings against each other such that the first rim abuts the second rim, but where the respective housings are able to be rotated with respect to the other. Further, the retaining ring includes a radially-oriented hole and a stop pin that is inserted into the hole and engages the pressure housing to prevent further rotation.

U.S. Pat. No. 9,297,392 discloses a pneumatic actuator including a housing defining a chamber. A diaphragm is positioned within the chamber. A rod member is attached to the diaphragm and is movable between a first position and a second position. A cam member is attached to the diaphragm and to the rod member. The cam member has a cam surface. A deflection rod has a first end portion and a second end portion, where the first end portion of the deflection rod is attached to the housing. A follower is attached to the second end portion of the deflection rod. The follower engages the cam surface of the cam member so as to time the rod member towards the second position.

SUMMARY

This Summary is provided herein to introduce a selection of concepts that are further described herein below in the Detailed Description. This Summary is not intended to identify key or essential features from the claimed subject matter, nor is it intended to be used as an aid in limiting the scope of the claimed subject matter.

In certain examples, a spring failure detection system includes an air brake cylinder with a spring axially extending therein, a sensor configured to sense forces applied to the air brake cylinder, and an indicator configured to indicate failure of the spring based on the forces sensed by the sensor.

In certain examples, a spring failure detection system is for detecting a first failure state of a first spring in a first air brake cylinder and a second failure state of a second spring in a second air brake cylinder. The system includes a first sensor coupled to the first air brake cylinder and configured to sense forces applied to the first air brake cylinder, a second sensor coupled to the second air brake cylinder and configured to sense forces applied to the second air brake cylinder, and an indicator configured to indicate failure of the first spring based on the forces sensed by the first sensor and failure of the second spring based on the forces sensed by the second sensor.

In certain examples, a method for detecting failure of a spring in an air brake cylinder includes sensing, with a sensor, forces applied to the air brake cylinder and indicating, with an indicator, failure of the spring based on how the forces sensed by the sensor compare to a threshold.

BRIEF DESCRIPTION OF THE DRAWINGS

Examples are described with reference to the following figures. Like reference numbers are used throughout the figures to reference like features and components.

DETAILED DESCRIPTION OF THE DRAWINGS

In the present disclosure, certain terms have been used for brevity, clearness and understanding. No unnecessary limitations are to be implied therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives, and modifications are possible within the scope of the appended claims.

The present inventors have recognized that it is often difficult to determine if a spring in an air brake has failed. Conventional methods are rudimentary (e.g. removing the air brake cylinder from the vehicle and shaking it while listening for the sound of pieces of the failed spring contacting a housing of the air brake cylinder). If a failed spring is left unattended, pieces of the failed spring may rupture the emergency diaphragm and cause a large enough air leakage such that all of the emergency brakes of the vehicle engage, thereby rendering the vehicle inoperable. In any event, an air brake cylinder with a failed spring should be taken out of service. Through research and experimentation, the present inventors have invented systems and methods that efficiently and effectively sense when the spring in the air brake cylinder fails and indicate the spring failure to the operator.

Figure 1:
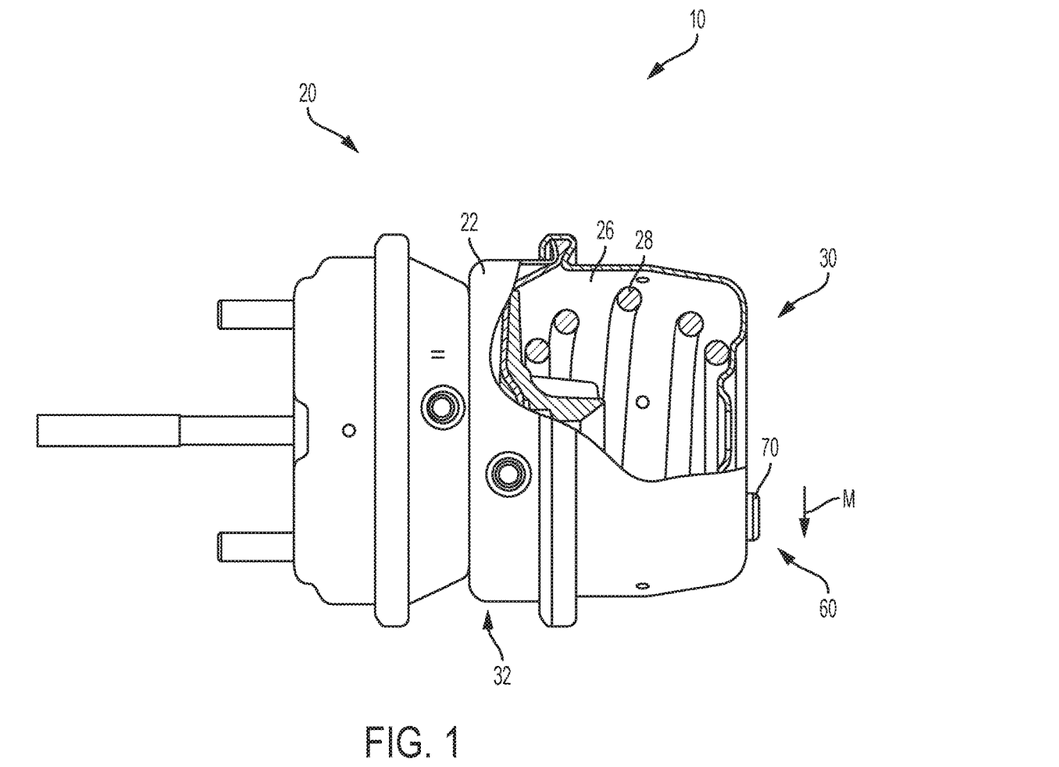
FIG. 1 depicts a side view of an air brake cylinder with portion cutaway to show a non-failed spring.
Figure 2:
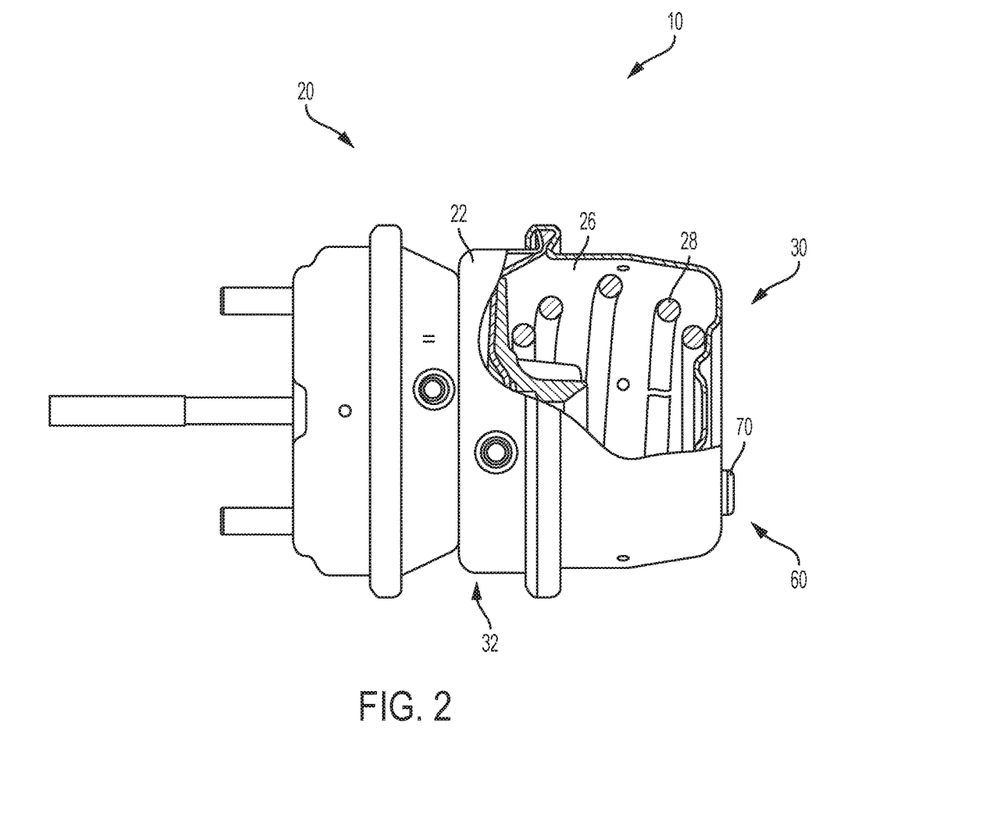
FIG. 2 depicts the air brake cylinder of FIG. 1 showing a failed spring.

FIGS. 1-2 depict an example of a vehicle air brake cylinder 20 of a vehicle braking system. The air brake cylinder 20 includes a housing 22 and a spring 28 that axially extends therein between a first end 30 and a second end 32 opposite the first end 30. The air brake cylinder 20 is of the type conventionally used on highway vehicles such as semi-trucks and other heavy haulers. Examples of air brake cylinders 20 are commercially available from TSE Brakes, Inc. (part nos. 3030TN2 and 3030SN2). Reference is also made to the above incorporated U.S. Patents for examples of air brake cylinders 20.

FIG. 1 depicts the air brake cylinder 20 with an operable, non-failed spring 28, and FIG. 2 depicts the air brake cylinder 20 with an inoperable, failed spring 28. The spring 28 can be subject to failure for any number of reasons including fatigue, over-loading, and/or material failure. When the spring 28 fails, the potential energy stored in the spring 28 is released and transferred to the housing 22 in the form of a spring failure impact force. The present inventors have discovered that the spring failure impact force is often greater than many other impact forces that are routinely encountered by the air brake cylinder 20 such as installation forces, testing forces, roadway forces, and/or the like. Thus, the spring failure impact force provides an excellent indicator of a failed spring.

According to the present disclosure, a spring failure detection system 10 includes a sensor 60 coupled to the air brake cylinder 20 and configured to sense forces applied to the air brake cylinder 20. The sensor 60 is configured to sense the spring failure impact force produced by the spring 28 when the spring 28 fails. The sensor 60 preferably is coupled axially along the air brake cylinder 20 (i.e., at the first end 30 of the air brake cylinder 20 and adjacent to the spring 28). The spring failure detection system 10 can include any number of sensors 60. The type of sensor 60 can vary and can include an accelerometer, inertia switch, kinetic switch, impact switch, and/or the like. Examples of suitable sensors 60 are commercially available from STMicroelectronics (part no. H3LIS331DLTR). The sensor 60 can be calibrated to sense forces that are at least equal to and/or greater than a threshold force which can be less than, equal to, or greater than an expected spring failure impact force. The expected spring failure impact force can, for example, be determined based upon historical data, trial-and-error, calibration, and/or the like.

The sensor 60 can be a one-time use sensor 60 that senses only one spring failure impact force. Such a one-time use sensor 60 must be replaced when it senses the spring failure impact force. In other examples, the sensor 60 can be a multi-use sensor 60 that can be reset after the spring failure impact force is sensed (i.e. the sensor 60 is reset such that it can sense additional forces). The multi-use sensor 60 can be reset by an external input 75 (see FIG. 3), such as pushing a button, applying an electrical charge to the sensor 60, moving a magnet across the sensor 60, and/or the like. In one example, a magnet is manually moved across the sensor 60 along a reset path (see movement arrow M on FIG. 1) to reset the sensor 60. The reset path M can be molded into the sensor 60.

The sensor 60 can be coupled to the housing 22 by adhesive, mechanical connections, and/or the like. The shape of the sensor 60 can vary from what is shown (e.g., it can be a disc, semi-circle, cylinder, polyhedron, and/or the like). In certain examples, the sensor 60 is shaped with at least two parallel flat sides that provide gripping surfaces for the operator to manually couple and/or remove the sensor 60 from the housing 22.

The spring failure detection system 10 includes an indicator 70 coupled to the sensor 60 and configured to indicate failure of the spring 28 based on the forces sensed by the sensor 60. The indicator 70 can include LED lights, computer displays, LCD displays, audible speakers, and/or the like.

Figure 3:
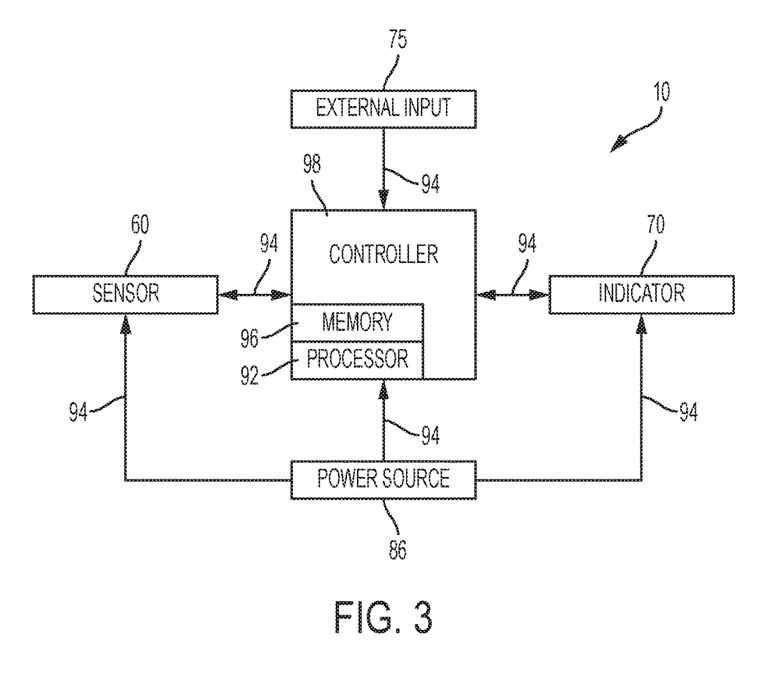
FIG. 3 is an example system diagram.

In the example shown in FIG. 3, the spring failure detection system 10 includes a controller 98 that is in communication with and/or coupled to the sensor 60 and/or the indicator 70. The controller 98 is configured to control the indicator 70 based on the forces sensed by the sensor 60. The controller 98 includes a processor 92 and a memory 96. The controller 98 can be located anywhere with respect to the sensor 60 and/or the indicator 70, including being embodied with the sensor 60 and/or remote from the sensor 60. The controller 98 can be configured to communicate with the sensor 60 and/or indicator 70 via wired and/or wireless communication links 94. One having ordinary skill in the art will recognize that the controller 98 can have many different forms and is not limited to the example that is shown and described.

In some examples, the controller 98 includes a computing system that includes a processing system, storage system (i.e., memory 96), software, and input/output (I/O) interfaces for communicating with devices. The processing system loads and executes software from the memory 96, such as software programmed with indication control methods (as further described herein below). The computing system can include one or many application modules and/or one or more processors, which may be communicatively connected. The processing system can include a microprocessor (e.g., processor 92) and/or other circuitry that retrieves and executes software from the memory 96. Non-limiting examples of the processing system include general purpose central processing units, applications-specific processors, and logic devices.

The memory 96 can include any type of storage media that is readable by the processing system and capable of storing software. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

The controller 98 communicates with one or more components of the system 10 via the communication links 94, which can be wired or wireless links. The controller 98 is capable of monitoring and controlling one or more operational characteristics of the system 10 and its various subsystems by sending and receiving control signals via the communication links 94. It should be noted that the extent of connections of the communication links 94 shown herein is for schematic purposes only, and the communication links 94 could in fact provide communication between the controller 98 and each of the sensors 60, indicators 70, and various components described herein, although not every connection is shown in the drawing for purposes of clarity.

In certain examples, the controller 98 is programmed to determine the failure state of the spring 28 by comparing the forces sensed by the sensor 60 to a spring failure impact force threshold, which is stored in the memory 96. When the force sensed by the sensor 60 exceeds the spring failure impact force threshold the controller 98 controls the indicator 70 to indicate the failure of the spring 28 to the operator.

In certain examples, the controller 98 is configured to cumulate or aggregate the magnitudes of a series of current and/or historical forces sensed by the sensor 60. When the aggregation of the forces exceeds an aggregate spring failure threshold, the controller 98 is configured to control the indicator 70 to indicate the failure of the spring 28. The aggregate spring failure threshold can be stored in the memory 96. The aggregate spring failure threshold can be a value that is calibrated and/or selected based upon a predicted failure of the spring 28. The aggregate spring failure threshold can be selected based upon trial-and-error and/or historical data.

In certain examples, the memory 96 stores a look-up table. The look-up table can include a plurality of remaining useful life of the spring 28 values that correlate to the aggregation of the series of forces sensed by the sensor 60 (e.g., the predicted remaining useful life of the air brake cylinder 20 is 1.5 years when the aggregation of the forces sensed by the sensor 60 is 5.2 kg·m/sec$^2$ (newtons), etc.). The controller 98 can be configured to compare the aggregation of the forces sensed by the sensor 60 to the look-up table to predict the remaining useful life of the spring 28. The controller 98 can be further configured to control the indicator 70 to indicate the remaining useful life of the spring 28 to an operator.

In certain examples, the memory 96 stores a vibration signature profile. The vibration signature profile corresponds to an expected vibration signature profile of the air brake cylinder 20 and can be based upon historical data and/or trial-by-error. The controller 98 is configured to compare the series of forces sensed by the sensor 60 to the vibration signature profile and then control the indicator 70 to indicate the failure of the spring 28 when the series of forces sensed by the sensor 60 are different from the vibration signature profile by a calibrated or otherwise selected amount.

Figure 4:
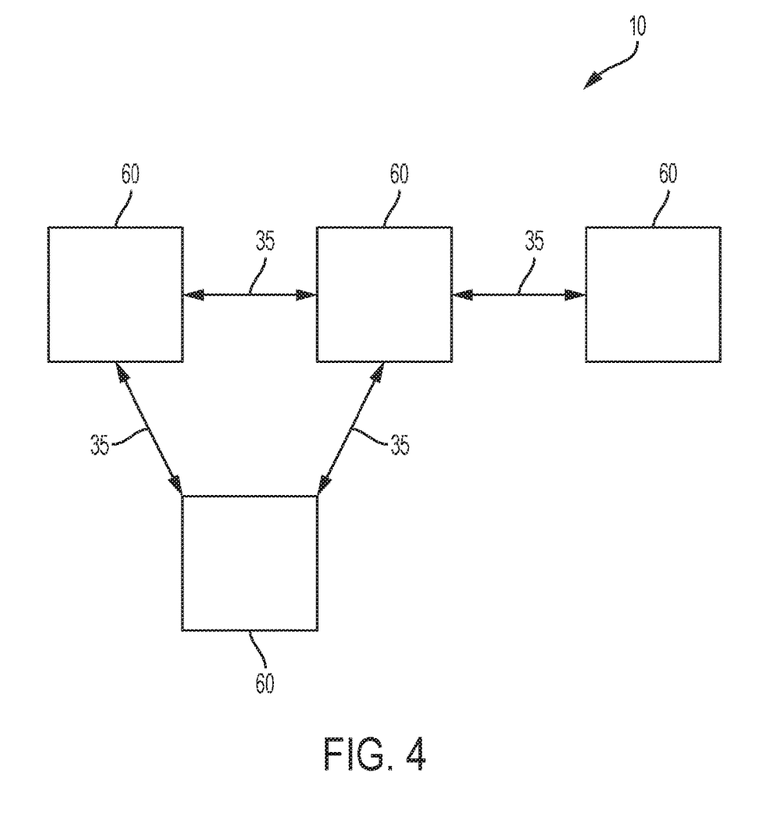
FIG. 4 is an example spring failure detection system with multiple sensors.

In the example shown in FIG. 4, the spring failure detection system 10 includes multiple sensors 60. For example, a sensor 60 can be provided at each air brake cylinder 20 on a vehicle. The sensors 60 can be connected by communication links 35, and the communication links 35 can form a network. For example, the sensors 60 can be transceivers that send and/or receive data to and/or from other sensors 60, the controller 98, and/or a computer accessible to the operator. The sensors 60 and the controller 98 can communicate to each other via one-way communication and/or via two-way communication.

In certain examples, the spring failure detection system 10 is configured to detect a first failure state of a first spring 28 in a first air brake cylinder 20 and a second failure state of a second spring 28 in a second air brake cylinder 20. For example, a first sensor 60 can be coupled to the first air brake cylinder 20 and configured to sense forces applied to the first air brake cylinder 20 and a second sensor 60 can be coupled to the second air brake cylinder 20 and configured to sense forces applied to the second air brake cylinder 20. The controller 98 can be configured to control the indicator 70 to indicate failure of the first spring 28 based on the forces sensed by the first sensor 60 and indicate failure of the second spring 28 based on the forces sensed by the second sensor 60.

Referring back to FIG. 3, the spring failure detection system 10 can include a power source 86 which provides power to the sensor 60, controller 98, and/or the indicator 70. The power source 86 can be any suitable power source including batteries, replaceable batteries, solar panel, kinetic energy harvester, and/or the like. Alternatively, the system 10 can be connected to an external power source, such a vehicle power system.

Methods for detecting failure of the spring 28 in the air brake cylinder 20 include sensing, with the sensor 60, the forces applied to the air brake cylinder 20, comparing the forces sensed by the sensor 60 to the spring failure impact force threshold, and indicating failure of the spring 28 based on the forces sensed by the sensor 60. The methods can further include aggregating a series of forces applied to the air brake cylinder 20, comparing aggregated forces to the aggregate spring failure threshold, and indicating failure of the spring 28 when the aggregation of the forces sensed by the sensor 60 is greater than the aggregate failure threshold. The methods can include determining the remaining useful life of the spring 28 based on the aggregation of the forces sensed by the sensor 60, indicating the remaining useful life of the spring 28 to an operator. The methods can include comparing the series of forces sensed by the sensor 60 to a vibration signature profile for the air brake cylinder 20, and/or indicating failure of the spring 28 when the series of forces sensed by the sensor 60 differs from the vibration signature profile by a calibrated amount. Methods for determining failure of at least one spring 28 in a system having multiple air brake cylinders 20 can include positioning one sensor 60 of a plurality of sensors 60 on each air brake cylinder 20 of a plurality of air brake cylinders 20, linking the sensors 60 of the plurality of sensors 60, and indicating failure of at least one of the springs 28 based on the forces sensed by the sensors 60. Methods for determining failure of at least one spring 28 in the system having at least a pair of sensors 60 and a least a pair of air brake cylinders 20 can include comparing, with the controller 98, the forces sensed by each of the sensors 60 in a pair of sensors 60 to determine if a spring 28 in a pair of air brake cylinders 20 has failed. In certain examples, the controller 98 is configured to compare the forces sensed by one sensor 60 in the pair of sensors 60 to a scaled version of the forces sensed by the other sensor 60 in the pair of sensors 60 and determine if a spring 28 in one of the pair of air brake cylinders 20 failed based on the comparison of the forces sensed by the one sensor 60 in the pair of sensors 60 and the scaled version the forces sensed by the other sensor 60 in the pair of sensors 60.

In certain examples, the controller 98 is configured to record and store vibration force information qualifying as fatigue damage imparted to the air brake cylinder 20 during the course of vehicle operation. The vibration force information can include magnitude, duration, and/or frequency of vibrations. The controller 98, through the indicator 70, can be configured to provide the operator with an estimated lifecycle (e.g. the remaining useful life) for the air brake cylinder 20 based on the vibration forces sensed by the sensor 60.

In severe vehicle applications (e.g. off-road applications), rigorous vibration forces and other forces cause fatigue in mounting bolts of the air brake cylinder 20 which may result in a loose air brake cylinder 20 and/or failure of the mounting bolt altogether. Over time, loss of mounting bolt compression and/or damage results in a distinguishable change in the vibration signature profile of the air brake cylinder 20, and the controller 98 can be programmed to determine the change in vibration signature profile by comparing sensed values to stored profile values, and then indicate the change to the operator via the indicator 70. In another example, the spring 28 may shift due to a parking spring (not shown). Spring shift occurs when the spring 28 becomes misaligned with the long axis of the air brake cylinder 20. After the spring shifts, the vibration signature profile of the air brake cylinder 20 is altered in a way that is distinguishable from the correctly aligned state. According to the present disclosure, the system 10, including the controller 98 and sensor 60, can be configured to detect this type of change in the vibration signature profile.

In certain examples, the controller 98 and a single sensor 60 are used to monitor the air brake cylinder 20, and the use of the single sensor 60 is an isolated node approach that applies a single layer of failure determination to discriminate between extraneous events (e.g. the wheels hitting a curb)

and the spring failure impact force (i.e. the failure of the spring 28). The controller 98 compares the forces sensed by the sensor 60 to the stored spring failure impact force or threshold value. The present inventors have determined that careful selection of the stored spring failure impact force, based on historical data and/or trial-by-error, makes it possible to eliminate extraneous events common to everyday use.

However, it is possible that an extraordinary extraneous event could exceed the spring failure impact force and induce a spurious indication of spring failure. In this particular case, the isolated node approach fails to appropriately determine the failure status. In the multi-node approach described herein, adding additional sensors 60 and adding sophistication to the controller 98 reduces the likelihood of registering a false positive of spring failure. For example, each axle of the vehicle can include two air brake cylinders 20 (one at each wheel end). By locating a sensor 60 at each air brake cylinder 20, the system 10 can capture vibration forces acting on the axle and permit advanced spring failure event validation. That is, when the spring failure impact force is sensed by the sensor 60 at one of the air brake cylinders 20, the controller 98 can be configured to communicate with the sensor 60 on the opposite air brake cylinder 20 to determine a possible spring failure impact force during a specified timeframe (i.e. a temporal window; e.g. 50 milliseconds). This type of multi-node approach to determining and/or validating spring failure validation contributes greatly to distinguishing between the following example scenarios:

(1) The first sensor 60 senses an actual spring failure impact force indicating an actual spring failure of the spring 28. The force generated by the failure of the spring 28 will not propagate in a significant manner to the second sensor 60. The controller 98 interrogates the second sensor 60 to provide positive or negative indication of a spring failure event during a specified timeframe. The controller 98 is configured to compare any simultaneously occurring coincidental vibrations and/or forces to a preselected threshold value of the second air brake cylinder 20. The threshold value may be a fixed value or it may be a scaled form of the registered event magnitude. If the coincidental vibrations fail to meet the preselected threshold value, the indicator 70 provides negative indication of a threshold value qualifying event.

(2) The first sensor 60 senses a spurious signal indicating spring failure of the spring 28 (e.g. collision of the wheel with a curb). The impact force of the collision propagates down the axle and is sensed to a lesser degree by the second sensor 60. The controller 98 interrogates the second sensor 60 to provide a positive or negative indication of a qualifying event during a specified timeframe. The controller 98 compares the vibration from the collision event against a threshold value of the second air brake cylinder 20. The threshold value may be a fixed value or it may be a scaled form of the registered event magnitude as communicated by the first sensor 60. Upon success of the simultaneous vibration to meet the threshold value, the indicator 70 provides positive indication of a threshold value qualifying event. In this way, it is possible to provide a mechanism to distinguish between simultaneous coincidental events—which are likely to be dissimilar in magnitude—and a single propagated event—which is likely to produce similar vibrations at each sensor 60.

In certain examples, a first sensor 60 detects a spring failure impact force and communicates the force to the controller 98. However, the force sensed by the first sensor 60 may not be a spring failure impact force caused by failure of the first spring 28 (i.e. the first sensor 60 senses the wheel hitting a curb). To confirm the failure of the first spring 28, the controller 98 compares the force sensed by the first sensor 60 to the forces sensed by the second sensor 60 within a timeframe (e.g. 50 milliseconds) to determine if the first spring 28 failed (i.e. to determine if the spring failure impact force sensed by the first sensor 60 is a result of the first spring 28 failing). The controller 98 may further scale the forces sensed by the second sensor 60 (e.g. a scaled version of the forces sensed by the second sensor 60) with a scaling factor and compare the scaled version of the forces sensed by the second sensor 60 (i.e. the scaling factor multiplied by the forces sensed by the second sensor 60) to the forces sensed by the first sensor 60. If the scaled version of the forces sensed by the second sensor 60 are indicative of an external event (e.g. the wheel hitting the curb) that caused the first sensor 60 to sense the spring failure impact force, the controller 98 does not indicate, via the indicator 70, the failure of the first spring 28. Alternatively, if the scaled version of the forces sensed by the second sensor 60 are not indicative of an external event (e.g. the wheel hitting the curb) that caused the first sensor 60 to sense the spring failure impact force, the controller 98 controls the indicator 70 to indicate failure of the first spring 28.

This type of multi-node approach is not limited to application across a single axle, but may be applied across all axles within a prescribed proximity to the initiating sensor 60.

In certain examples, the spring failure detection system 10 is a "single shot" technique, meaning that there is only one opportunity to capture the spring failure during the life of the spring 28. This fact heightens the importance of placing the sensor 60 in a preferred location where it is most likely to detect the full magnitude of the spring failure impact force from a spring 28. Locations that are poorly connected to the housing 22 or that are further removed from axis along which the spring 28 extends, are less effective in transmitting the vibration force and decrease the signal-to-noise ratio experienced by the sensor 60. Through research and experimentation, present inventors have determined that the flat end of the housing 22 which supports the spring 28 is a preferred location for measuring the spring failure impact force and coupling the sensor 60 to the housing 22.

What is claimed is:

1. A spring failure detection system comprising:
an air brake cylinder with a spring axially extending therein, wherein failure of the spring creates a spring failure impact force that is applied to the air brake cylinder;
a sensor coupled to the air brake cylinder and configured to sense forces applied to the air brake cylinder; and
an indicator configured to indicate failure of the spring when at least one of the forces sensed by the sensor is equal to or greater than the spring failure impact force.

2. The spring failure detection system according to claim 1, further comprising a controller having a memory and being in communication with the sensor and the indicator and configured to control the indicator to indicate the failure of the spring when the sensor senses the spring failure impact force.

3. A spring failure detection system comprising:
an air brake cylinder with a spring axially extending therein;
a sensor configured to sense a series of forces applied to the air brake cylinder;

an indicator configured to indicate failure of the spring based on magnitudes of the forces sensed by the sensor; and a controller having a memory and being in communication with the sensor and configured to control the indicator to indicate failure of the spring;

wherein the controller aggregates the magnitudes of forces sensed by the sensor; and wherein the controller controls the indicator to indicate a failure of the spring when the aggregated magnitudes of the forces exceeds a spring failure impact force threshold stored on the memory.

4. The spring failure detection system according to claim 3, wherein the memory stores a look-up table, the look-up table correlating remaining useful life of the spring values to aggregated magnitudes of forces; and wherein the controller is configured to compare the aggregated magnitudes of forces sensed by the sensor to the look-up table to thereby determine a remaining useful life of the spring; and wherein the controller controls the indicator to indicate the remaining useful life of the spring.

5. The spring failure detection system according to claim 3, wherein the memory stores a vibration signature profile therein;

wherein the controller is configured to compare the forces sensed by the sensor to the vibration signature profile; and wherein the controller is further configured to control the indicator to indicate the failure of the spring when the forces sensed by the sensor differ from the vibration signature profile.

6. A spring failure detection system for detecting a first failure state of a first spring in a first air brake cylinder and a second failure state of a second spring in a second air brake cylinder, the spring failure detection system comprising:

a first sensor coupled to the first air brake cylinder and configured to sense forces applied to the first air brake cylinder;

a second sensor coupled to the second air brake cylinder and configured to sense forces applied to the second air brake cylinder;

an indicator configured to indicate failure of the first spring based on the forces sensed by the first sensor and failure of the second spring based on the forces sensed by the second sensor; and a controller having a memory and being in communication with the first sensor and the second sensor and configured to control the indicator;

wherein controller is configured to compare the forces sensed by the first sensor to the forces sensed by the second sensor to determine if the first spring failed.

7. The spring failure detection system according to claim 6, wherein the controller is further configured to compare the forces sensed by the first sensor to a scaled version of the forces sensed by the second sensor, wherein the controller is configured to determine if the first spring failed based on the comparison of the forces sensed by the first sensor and the scaled version of the forces sensed by the second sensor.

8. A method for detecting failure of a spring axially extending in an air brake cylinder, the method comprising:

sensing, with a sensor, a series of forces applied to the air brake cylinder;

comparing, with a controller having a memory, the forces applied to the air brake cylinder to a spring failure impact force threshold stored on the memory that corresponds to a spring failure impact force that is applied to the air brake cylinder by the spring when the spring fails; and indicating, with an indicator, failure of the spring when at least one of the forces sensed by the sensor is equal to or greater than the spring failure impact force threshold.

9. The method according to claim 8, further comprising:

aggregating, with the controller, magnitudes of the forces sensed by the sensor; and comparing the aggregated magnitudes of the forces to the spring failure impact force threshold; and indicating the failure of the spring to an operator when the aggregated magnitudes of the forces is greater than the failure impact force threshold.

10. The method according to claim 9, further comprising:

determining a remaining useful life of the spring based on how the aggregated magnitudes of the forces compare to the spring failure impact force threshold; and indicating the remaining useful life of the spring to the operator.

11. The method according to claim 8, wherein the sensor is one of a plurality of sensors and wherein the air brake cylinder is one of a plurality of air brake cylinders; the method further comprising:

positioning each sensor in the plurality of sensors on each air brake cylinder in the plurality of air brake cylinders;

linking each sensor in the plurality of sensors to the controller; and controlling, with the controller, an indicator to indicate failure of one of the springs based on the forces sensed by the sensors.

12. The method according to claim 11, wherein the controller is configured to compare the forces sensed by a first sensor in the plurality of sensors to a scaled version of the forces sensed by a second sensor in the plurality of sensors; and wherein the controller is configured to determine if a spring in one of the plurality of air brake cylinders failed based on the comparison of the forces sensed by the first sensor in the pair plurality of sensors and the scaled version the forces sensed by the second sensor in the plurality of sensors.

13. The method according to claim 8, further comprising:

comparing, with the controller, the forces sensed by the sensor to a vibration signature profile; and indicating failure of the spring when the forces sensed by the sensor differs from the vibration signature profile.

* * * * *